(12) United States Patent
Kadyk

(10) Patent No.: US 8,123,075 B2
(45) Date of Patent: Feb. 28, 2012

(54) AUTOMATIC FILL SYSTEM FOR BEVERAGE MACHINE

(75) Inventor: Jeff W. Kadyk, Sherman, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 467 days.

(21) Appl. No.: 11/459,822

(22) Filed: Jul. 25, 2006

(65) Prior Publication Data

US 2008/0023486 A1 Jan. 31, 2008

(51) Int. Cl.
*B67D 5/08* (2006.01)
(52) U.S. Cl. .................... 222/64; 222/129.1
(58) Field of Classification Search ............. 141/94, 141/102, 103–107, 302; 222/64, 129.1
See application file for complete search history.

(56) References Cited

U.S. PATENT DOCUMENTS

| 3,638,392 | A | * | 2/1972 | Welker et al. ............... 53/503 |
| 4,201,558 | A | * | 5/1980 | Schwitters et al. ........... 62/70 |
| 4,728,005 | A | * | 3/1988 | Jacobs et al. ............... 222/64 |
| 4,979,639 | A | * | 12/1990 | Hoover et al. ............... 222/1 |
| 6,149,035 | A | * | 11/2000 | Gorski et al. .......... 222/129.4 |
| 6,349,852 | B1 | * | 2/2002 | Ford ......................... 222/56 |
| 6,446,835 | B1 | * | 9/2002 | Ford ......................... 222/56 |
| 6,688,134 | B2 | * | 2/2004 | Barton et al. .............. 62/390 |
| 6,761,036 | B2 | * | 7/2004 | Teague et al. ............... 62/70 |
| 6,807,460 | B2 | * | 10/2004 | Black et al. ................ 700/244 |
| 6,962,270 | B1 | * | 11/2005 | Barker et al. .......... 222/129.4 |
| 2003/0085237 | A1 | * | 5/2003 | Kateman et al. ............. 222/1 |

* cited by examiner

*Primary Examiner* — Kevin P Shaver
*Assistant Examiner* — Donnell Long
(74) *Attorney, Agent, or Firm* — Barnes & Thornburg LLP

(57) ABSTRACT

A system and method delaying refilling of a reservoir in a beverage dispensing system or dispensing of a mixed volume to prevent undesirable characteristics in the dispensed beverage. First, a volumetric freezing rate is determined for the product. Next, a volume of frozen product is dispensed. The rate the dispensed volume is refilled is controlled to be no faster than the volumetric freezing rate.

21 Claims, 4 Drawing Sheets

AUTOMATIC FILL SYSTEM FOR BEVERAGE MACHINE

BACKGROUND AND SUMMARY

The present application relates to a method of controlling a beverage making device. In particular, the present disclosure relates to controlling frozen beverage type beverage making devices.

Some frozen beverage making devices today control the volume of water and/or product in a mixing hopper in a manner that may cause dilution of frozen product that was previously ready to serve to customers. Today's typical machine would refill the entire amount of new product into the hopper. This resulting product may become warmer than desired as a result of using refill water at one temperature and previously mixed product at a second temperature. This may causes the remaining volume of previously frozen product to melt and therefore become unsuitable for serving.

Briefly, and in accordance with the foregoing, disclosed is a system and method for delaying refilling of a reservoir or hopper with dilution substance to prevent undesirable characteristics in the resultant beverage. First, a volumetric freezing rate is determined for the product. Next, a volume of product having the desired temperature-related characteristics is dispensed. That volume is measured or calculated during dispensing. The rate the dispensed volume is refilled is controlled to be no greater than the volumetric temperature adjustment rate or re-freezing rate. Alternatively, the beverage dispensing system may disable or otherwise prevent dispensing until the refilled volume is permitted to re-freeze.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which.

Figure 1:
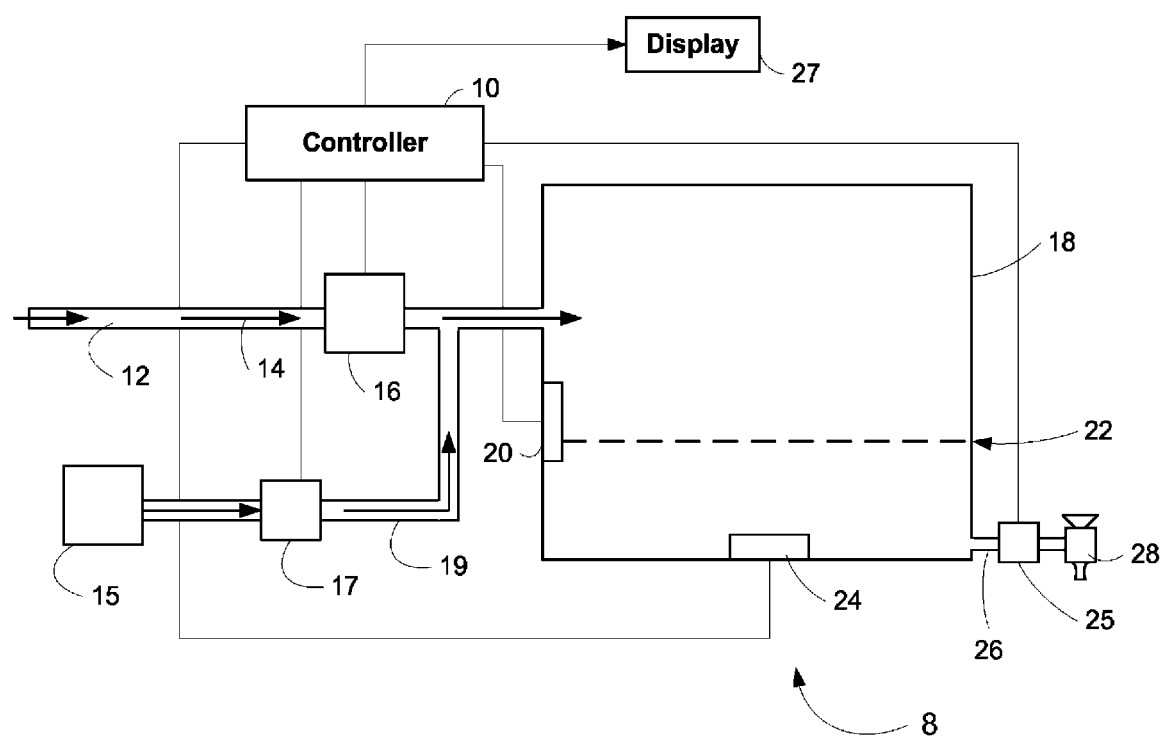
FIG. 1 is a simplified diagrammatic view of a beverage dispensing system of the present disclosure.

The exemplification set out herein illustrates embodiments of the disclosure that is not to be construed as limiting the scope of the disclosure in any manner.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

Terms including brewed, brewing, brewing substance, brewing liquid, and brewed beverage as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating, cooling, freezing, heating or passing a liquid through or otherwise mixing or combining a beverage or food substance with a liquid such as water without a limitation to the temperature of such liquid unless specified. This broad interpretation is also intended to include, but is not limited to beverage or food substances such as ground coffee, tea, soup, liquid beverage or food concentrate, powdered beverage or food concentrate, freeze dried beverages or foods or other food concentrates. Additionally, other forms of juice, tea and beverage concentrates and liquid, semi-liquid or gel form may be provided.

FIG. 1 is a simplified diagrammatic view of a typical beverage dispensing system or beverage maker 8. Although one embodiment of a beverage maker 8 is shown, the present method may be employed with a variety of beverage makers, including by way of example, but not limitation, any of the embodiments disclosed in U.S. Pat. No. 6,446,835 issued Sep. 10, 2002 and assigned to the assignee of the present application, the disclosure of which is hereby incorporated by reference in its entirety.

Beverage maker 8 may include a controller 10 for controllably operating at least a portion of beverage maker 8. Beverage maker 8 includes an inlet tube 12 for allowing passage of a dilution substance 14 such as water. A flow control device 16, such as an inlet valve, may be positioned along inlet tube 12 for controlling flow therethrough. Flow control device 16 may be in communication with controller 10. Inlet tube 12 is coupled to a hopper or reservoir 18 for storing a volume of substance. Although a single inlet tube 12 is shown, beverage maker 8 may include additional inlet tubes of similar construction. The beverage equipment 8 may also include a product tube 19 to carry dilution substance and/or beverage making products or ingredients from a source 15, such as a powder dispenser or bag-in-box container to inlet tube 12 for mixing with water or other dilution substance therein. A valve 17 may be positioned along product tube 19 for controlling flow. Controller 10 may be in communication with valve 17 for controllable operation. A level sensor 20 may be provided in cooperation with reservoir 18 for sensing a level 22 of product therein.

Reservoir 18 may include a temperature adjusting element 24, such as a heating element or freezing element, for adjusting the temperature of the substance in reservoir 18. Beverage maker 8 also includes an outlet tube 26, shown in FIG. 1 in the form of a faucet 28, although other embodiments such as a dispensing nozzle may be used as well. An outlet valve 25 may be positioned along outlet tube 26, and be in communication with controller 10.

Beverage maker 8 may also include a display 27, which may show, among other information about beverage maker 8, information about whether a mixed or prepared beverage is available for dispensing. Additionally, display 27 may show how soon a beverage will be available if the beverage is not yet available.

Figure 2:
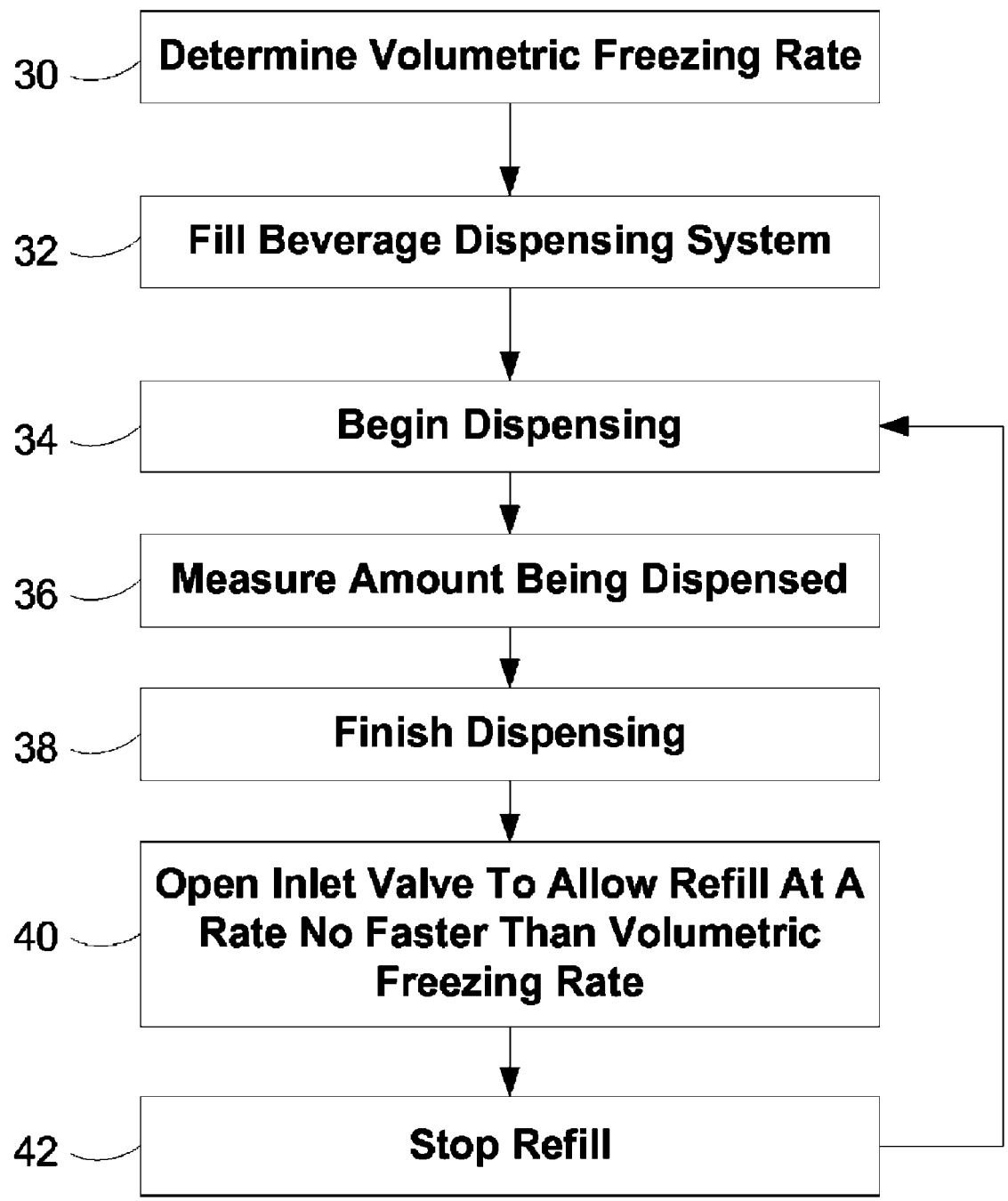
FIG. 2 is a flowchart depicting the steps in a method of controlling dispensing from the beverage dispensing system.

A method of operating beverage maker 8 to provide a dispensed beverage of desired characteristics is shown in FIG. 2. These steps generally describe an entire series of steps to dispense such a first beverage and then additional servings of the beverage. In operation, fewer than all of the steps may actually be performed because certain steps were only required for the complete series. The present embodiment is explained for a frozen beverage being dispensed, i.e. a beverage having a frozen element, although the disclosed steps may readily adapted to a heated beverage embodiment without undue experimentation.

In a first step 30, a volumetric temperature adjustment rate, referred to hereinafter as a volumetric freezing rate, for the beverage is determined. This determination may be made based on the characteristics of the beverage being dispensed. A desired characteristic, for example, may be what percentage of the mixed beverage is frozen or semi-frozen, and what percentage is liquid. Different varieties of frozen beverages may have different percentages attributed to a desired flavor or consistency. The volumetric freezing rate and/or the characteristics for determining the volumetric freezing rate may be pre-programmed into beverage maker 8, in particular into controller 10, or be entered or selected by an operator prior to a dispensing cycle. For example, for a particular granita frozen beverage, the volumetric freezing rate may be determined to be 12 ounces every five minutes or 2.4 ounces/min.

The precision of the volumetric freezing rate may be different among various beverages, in part because there may be a range of desirable beverage characteristics that are acceptable. The volumetric freezing rate may therefore be selected to be a limit or cap defining the shortest period the beverage mixture can be cooled to have acceptable frozen beverage characteristics for the selected beverage.

In a next step 32, the beverage dispensing system 8 is filled. This step of filling may involve providing a dilution substance such as water to reservoir 18, and combining the dilution substance with beverage making materials such as syrup or powdered concentrate. In a step 32, the filled volume is chilled to an acceptable level, such as to a predetermined consistency.

In a step 34, a dispensing cycle begins. The volume of beverage being dispensed is measured in a step 36, which can be accomplished using a variety of methods including using a flow meter along outlet tube 26, positioning a flow meter along inlet tube 12, sensing a level change using level sensor 20, or any other method. The length of the dispensing cycle may be determined by how long an operator operates the beverage dispensing system 8 to dispense, or at a preset interval such as to fill a cup of a particular size. The dispensing cycle is then completed (step 38).

A refill cycle can next be performed to allow refilling of reservoir 18 generally at a rate no faster than the volumetric freezing rate (step 40). Refilling in this manner prevents any new dilution substance or beverage making ingredients from entering reservoir 18, to prevent warming the mixture to a point where its temperature-related characteristics are out of a preset limit. For example, the mixture might be too hot causing the beverage to be melted rather than frozen. Once the dispensed volume is refilled, inlet valve 12 is closed, and the refill stops (step 42).

Figure 3:
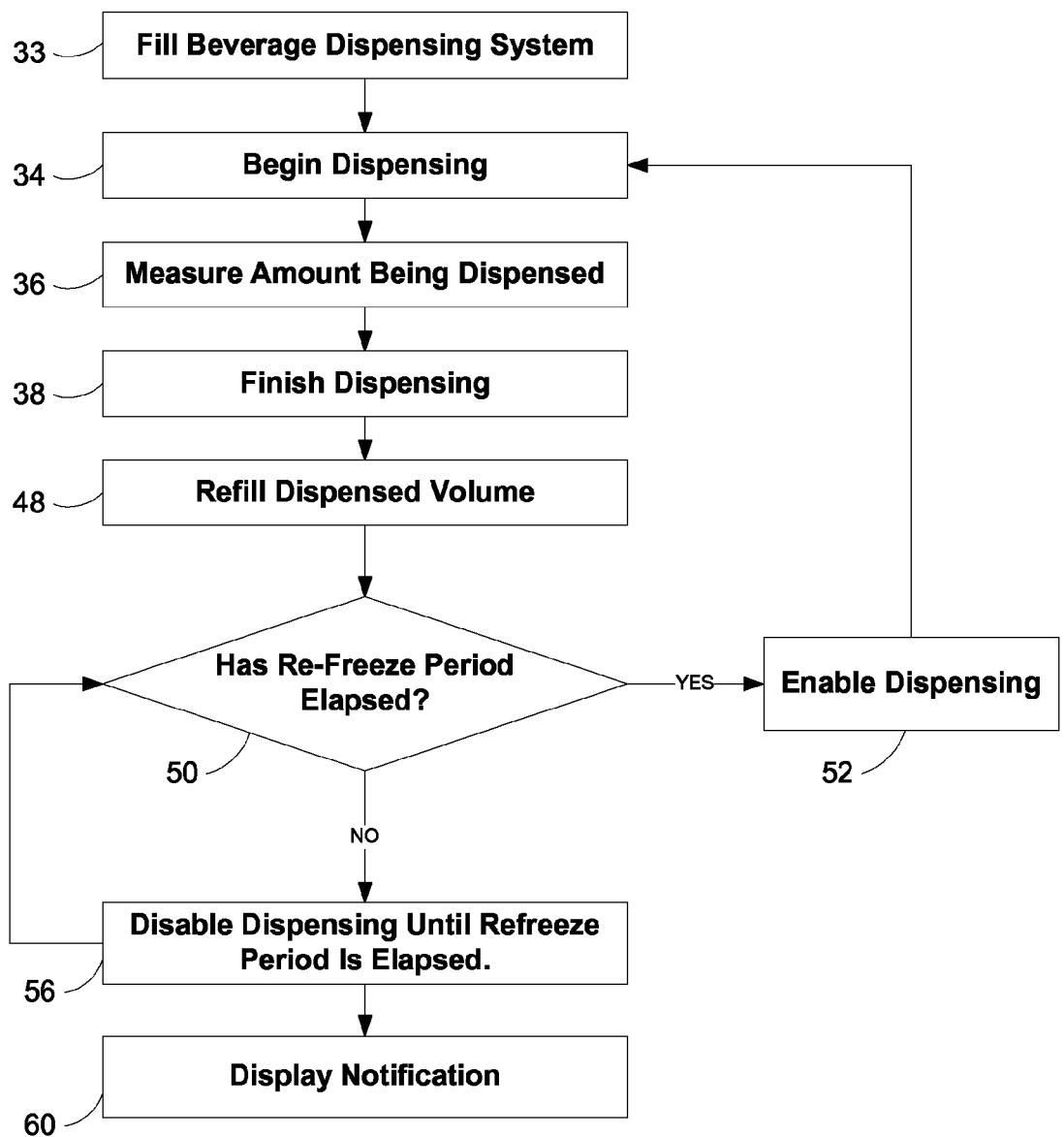
FIG. 3 is an alternative embodiment of the method of FIG. 2.

In alternative embodiment, as illustrated in FIG. 3, following dispensing of a volume of beverage (step 38), the dispensed volume is refilled (step 48). A logical check is made as to determine whether sufficient time has passed to allow the mixed volume to re-freeze so that the new mixed volume once again has the desired frozen beverage characteristics (step 50). Such time period is referred to herein as the re-freeze time. If the re-freeze time has elapsed, further dispensing is then enabled (step 52).

If the re-freeze time has not elapsed, at least a portion of the beverage dispensing system 8 may be disabled (step 56). Any manner of locking out or disabling the beverage dispensing system 8 may used, including but not limited to, closing the outlet port or locking down electronics associated with dispensing to prevent mixed beverage from being dispensed.

In the event a mixed beverage having the desired characteristics is not yet available, a notification to that effect may be displayed to an operator (step 60). Additionally, an operator may be notified of the time remaining until the re-freeze time has expired. For example, display 27 may read "30 Seconds" to inform the operator that he or she needs to wait another 30 seconds before dispensing.

In this manner, the quality of dispensed beverage can be controlled at the equipment level. The controller 10 may store one or more settings related to the dispensing and/or refill timing, to the re-freeze period, and/or to the volumetric freeze rate. These settings may be changed by an operator or other party controlling the beverage dispensing system 8 to adjust the characteristics of the dispensed beverage, such as making it more or less frozen.

The settings can also be set to automatically adjust to a change in equipment components. For example, if a freezing temperature adjustment element 24 is replaced with a more powerful version, or if additional such components are added, the volumetric freezing rate would increase and the re-freeze period would be reduced. Another example would be if the insulation on the reservoir 18, or the reservoir 18 itself, would be replaced with a more thermally insulated material. In that event, the heat loss through the walls might be less, also increasing the freezing rate and decreasing the re-freeze period. Following such component changes, time to refill, and/or time to re-enable dispensing, would be adjusted accordingly.

An example of using the present system and/or method is as follows. The dispensing system 8 will delay the refill process allowing the previously frozen product to maintain consistency and be available for consumption. The beverage equipment 8 has two gallons of frozen product ready to serve and four servings can be dispensed at 32 ounces each (totaling 128 ounces). The beverage equipment 8 would be controllably operated to fill in small batches such as 12 ounces. These 12-ounce batches may be disposed into the hopper at a rate of one every 5 minutes. These small batches will have an acceptable effect on the previously frozen product so that product will remain servable. In this particular embodiment, the beverage dispensing system 8 would continue to refill the reservoir 18 at a preset rate until the level probe 20 detects product at the correct level 22.

Figure 4:
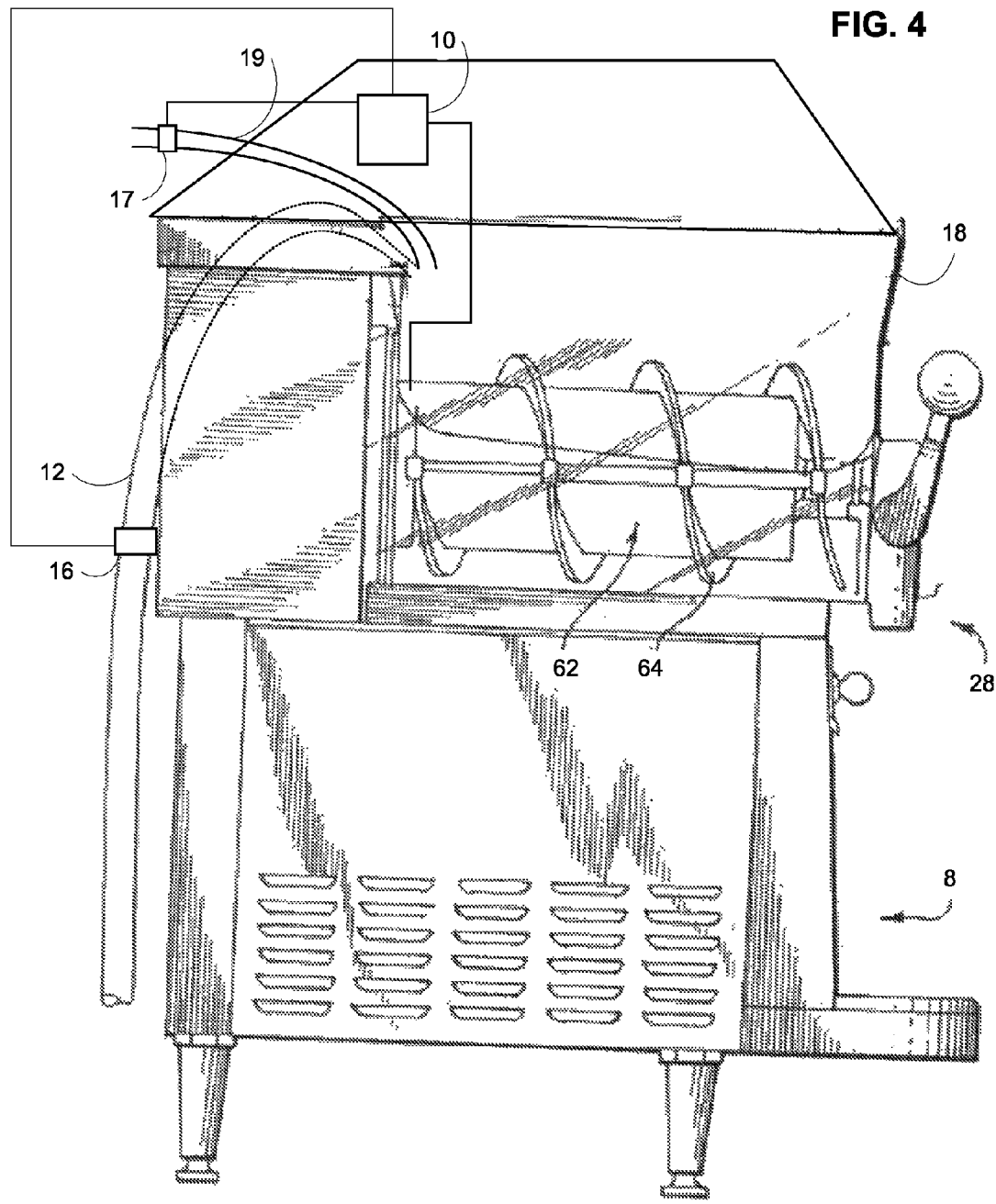
FIG. 4 is side elevational, partial cross-sectional view of an embodiment of a refill assembly according to the present disclosure.

An exemplary embodiment of beverage equipment 8 that may be used with the present method is shown in FIG. 4. A liquid inlet tube 12 brings liquid such as water toward reservoir 18 for mixing with product, such as flavored powder from product tube 19. Flow is controlled by controller 10 such as by actuating valve 17. A mixture of product and water arrives in reservoir 18. In the illustrated embodiment, reservoir 18 has an auger 62 with blades 64 positioned therein for agitating and mixing the mixed product prior to dispensing from faucet 28.

An existing beverage dispensing system 8 may include programming for enacting the method described herein, or be retrofitted with a suitable controller, or other control device, to have the requisite functionality. Reprogramming may be accomplished by adding one or more software modules containing instructions to operate the controller 10 or beverage equipment as described above. The term "computer module" or "software module" referenced in this disclosure is meant to be broadly interpreted and cover various types of software code including but not limited to routines, functions, objects, libraries, classes, members, packages, procedures, methods, or lines of code together performing similar functionality to these types of coding. The components of the present disclosure are described herein in terms of functional block components, flow charts and various processing steps. As such, it should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, SQL, C++, Java, COBOL, assembler, PERL, or the like, with the various algorithms being implemented with any combination of data structures, objects, processes, routines or other programming elements. Further, it should be noted that the present disclosure may employ any number of conventional techniques for data transmission, signaling, data processing, network control, and the like as well as those yet to be conceived.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

What is claimed is:

1. A beverage dispensing system for controlling a temperature-related beverage characteristic of a dispensed beverage, the beverage dispensing system comprising:
    a reservoir for retaining a volume of a beverage to be dispensed;
    a controllable outlet tube coupled to the reservoir for dispensing the beverage from the reservoir;
    at least one inlet tube for allowing passage of at least one of a dilution substance, a beverage making ingredient, or a combination of both to the reservoir, the dilution substance and beverage making ingredient forming a refill volume of beverage when mixed and dispensed into the reservoir; and
    a controller for controlling at least a portion of the beverage dispensing system, the controller containing the volumetric freeze rate of the beverage to be dispensed, the controller containing instructions for controllably operating the beverage dispensing system to dispense a refill volume of beverage into the reservoir at a rate which is less than the volumetric freeze rate of the beverage to be dispensed.

2. The beverage dispensing system of claim 1, further comprising a temperature adjusting element in cooperation with the reservoir.

3. The beverage dispensing system of claim 2, the temperature adjusting element comprising a freezing element.

4. The beverage dispensing system of claim 1, further comprising a controllable inlet valve positioned in controllable communication along the at least one inlet tube and coupled with the controller.

5. The beverage dispensing system of claim 1, further comprising, a level sensor in communication with the reservoir for detecting a level of beverage in the reservoir, the level sensor being coupled with the controller.

6. The beverage dispensing system of claim 1, further comprising a controllable outlet valve positioned in controllable communication along the at least one outlet tube and coupled with the controller.

7. The beverage dispensing system of claim 6, further comprising the controller containing instructions to controllably dispensing a refill volume of beverage to refill the reservoir to a predetermined level sensed by the level sensor when refilling the reservoir.

8. The beverage dispensing system of claim 1, further comprising a display coupled to the controller for displaying information relating to the beverage maker.

9. A method of controlling a beverage dispensing system having a reservoir for retaining a volume of beverage, the method comprising the steps of:
    predetermining a volumetric temperature adjustment refill rate for a beverage retained in the beverage dispensing system reservoir;
    preparing a volume of the beverage in the beverage dispensing system reservoir by temperature adjusting the volume of beverage in the reservoir to at least a range of predetermined temperature-related beverage characteristics;
    a user controllably dispensing a volume of the beverage from the beverage dispensing system reservoir;
    automatically refilling the beverage dispensing system with a refill volume of beverage refill substance generally equal to the volume dispensed;
    refilling the refill volume of beverage at a rate related to the predetermined temperature-related beverage characteristic and less than the a volumetric temperature adjustment rate to form the additional beverage from the refill volume to maintain a desired temperature-related beverage characteristic; and
    dispensing the additional beverage.

10. The method of claim 9, the volumetric temperature adjustment rate comprising a volumetric freezing rate, and the beverage comprising a frozen beverage.

11. A method of controlling a beverage dispensing system, the method comprising the steps of:
    providing a beverage dispensing system comprising a reservoir for retaining a volume of a beverage to be dispensed, a controllable outlet tube coupled to the reservoir for dispensing the beverage, and at least one inlet tube for allowing passage of at least one of a dilution substance, a beverage making ingredient, or a combination of both to the reservoir, a controller coupled to the beverage dispensing system for operatively controlling the beverage dispensing system in relation to at least a range of predetermined temperature-related beverage characteristics;
    filling the beverage reservoir to a predetermined level with the dilution substance and the beverage making ingredient and temperature adjusting the volume of beverage in the reservoir to a predetermined temperature-related beverage characteristic;
    controllably mixing the dilution substance and the beverage making ingredient to form a refill beverage;
    dispensing a volume of beverage through the outlet tube;

the controller automatically initiating refilling of the reservoir to a predetermined level and at a rate related to the temperature-related beverage characteristic with the dilution substance and the beverage making ingredient to form a refill volume of beverage having a volume generally equal to the volume dispensed; and allowing further dispensing of the additional beverage from the reservoir when a temperature adjustment period related to the temperature-related beverage characteristic has elapsed.

12. The method of claim 11, further comprising the beverage being a frozen beverage and the temperature adjustment period being a re-freeze period.

13. The method of claim 11, further comprising:
providing an outlet valve along the outlet tube, providing a controller in communication with the outlet valve, and
controllably operating the outlet valve to allow further dispensing of the beverage when the temperature adjustment period has elapsed.

14. The method of claim 11, further comprising disabling at least a portion of the beverage dispensing system to prevent further dispensing of the beverage until the temperature adjustment period has elapsed.

15. The method of claim 14, further comprising the disabled portion being an outlet valve.

16. The method of claim 14, further comprising the disabled portion being one of a dispensing faucet and dispensing nozzle.

17. The method of claim 11, further comprising notifying to an operator that the temperature adjustment period has not elapsed.

18. The method of claim 17, further comprising notifying the operator of a time remaining before the temperature adjustment period elapses.

19. The method of claim 11, further comprising the temperature adjustment period being a re-freeze period.

20. The method of claim 19, further comprising adjusting the re-freeze period to change a characteristic of the beverage.

21. The method of claim 11, further comprising adjusting the temperature adjustment period in response to replacement of a component of the beverage dispensing system, the component having an effect on a temperature adjustment characteristic of the beverage.

* * * * *